United States Patent [19]

Murayama et al.

[11] 3,964,585
[45] June 22, 1976

[54] HYDRAULIC DOUBLE CLUTCH OF THE WET TYPE WITH PRESSURE CONTROL VALVES

[75] Inventors: Yoshinobu Murayama; Yashunori Uchibori, both of Sakai, Japan

[73] Assignee: Kubota Tekko Kabushiki Kaisha, Osaka, Japan

[22] Filed: Mar. 13, 1975

[21] Appl. No.: 557,964

[52] U.S. Cl. ................. 192/87.13; 192/87.15; 192/87.18; 192/109 F; 192/113 B; 74/15.84; 137/530
[51] Int. Cl.² ........................... F16D 25/10
[58] Field of Search ........... 192/87.11, 87.13, 87.15, 192/87.18, 87.19, 113 B, 109 F

[56] References Cited
UNITED STATES PATENTS

| | | | |
|---|---|---|---|
| 2,505,450 | 4/1950 | Wemp | 192/87.13 X |
| 2,868,341 | 1/1959 | Snoy | 192/113 B X |

FOREIGN PATENTS OR APPLICATIONS

| | | | |
|---|---|---|---|
| 370,848 | 3/1939 | Italy | 192/109 F |

*Primary Examiner*—Benjamin W. Wyche
*Attorney, Agent, or Firm*—Armstrong, Nikaido & Wegner

[57] ABSTRACT

Hydraulic double clutch comprising a tractor-driving clutch unit and a power takeoff clutch unit accommodated in a clutch housing serving also as an oil tank. Hydraulic pumps disposed in the housing have gears respectively meshing with a gear on the drive disk assembly of the double clutch to force the working oil into the clutch units through individual oil passages and to push the pistons of the units. Each of the oil passages is provided with a poppet valve at an intermediate portion thereof. The poppet valves are opened or closed to disengage or engage the clutch units independently of each other for interruption or transmission of the torque of engine. Each of the valves is automatically opened when the pressure on the piston builds up to excess and is therefore serviceable also as a pressure control valve. The valve is operable to bring the clutch unit into substantially semi-engaged state.

5 Claims, 10 Drawing Figures

HYDRAULIC DOUBLE CLUTCH OF THE WET TYPE WITH PRESSURE CONTROL VALVES

BACKGROUND OF THE INVENTION

The present invention relates to hydraulic clutches of the wet type for use in power transmission systems to effect or interrupt power transmission, and more particularly to a double clutch serviceable as the main clutch of agricultural tractors and like vehicles equipped with drive wheels and power takeoff means.

Generally, single clutches of the dry type are widely used as the main clutch for interrupting or effecting transmission of the torque of engine to a speed change system. However, friction clutches of the dry type involve the inherent problem that because the play of the clutch pedal or the amount of idle travel of the clutch pedal tends to vary due to the abrasion of the disk, proper engagement and disengagement of the clutch requires frequent adjustment in accordance with variations in the amount of idle pedal travel. When the clutch is to be modified into a double clutch which requires a larger clutch case, it becomes difficult to accommodate the double clutch assembly in the single clutch housing, and there arises the necessity to employ another housing for the clutch assembly. Furthermore in systems in which a double clutch of the dry type is incorporated, means is included by which the clutch is automatically disengaged when a working implement such as rotary tiller has been lifted. With such system, however, the thrust bearing employed is subject to excessive thrust loads, which cause adhesion of the bearing owing to frictional heat, consequently breaking down the part in a short period of time. Thus the dry-disk double clutch involves problems in respect of durability.

Because of these problems, hydraulic friction clutches of the wet type which operate as immersed in oil are employed. Clutches of this type have the advantages of being low in coefficient of friction, permitting efficient dissipation of heat, involving reduced abrasion and being settable for the desired capacity when the relief pressure is changed, whereas hydraulic double clutches still have disadvantages, because according to conventional systems, the working oil taken in by a hydraulic pump is divided by a divider valve and fed to oil passages for the tractor-driving clutch unit and power takeoff clutch unit under the control of valves provided therefor respectively. Thus conventional systems require at least three valves which are expensive and render the overall construction costly. Moreover, the complex piping means necessary to supply the working oil to the clutch tends to cause pressure losses.

With hydraulic clutches of the wet type, the control valve provided at an intermediate portion of the oil passage for feeding the working oil to the clutch piston is opened or closed by a clutch pedal or like operating member by way of link means or the like. The valve conventionally used for this purpose functions in direct fashion merely to open or close the oil passage, only permitting interruption of the torque from the drive member or transmission of the torque therefrom to the driven member. It is therefore very difficult to bring the clutch into an intermediate state between engagement and disengagement, namely into semi-engaged state.

SUMMARY OF THE INVENTION

An object of this invention is to overcome the drawbacks of the main clutch for use in agricultural tractors or the like having driving wheels and power takeoff means and to provide a hydraulic double clutch of the wet type which has a very compact clutch casing and which is inexpensive.

Another object of this invention is to provide a hydraulic double clutch of the wet type including a drive disk assembly having a single gear, a wheel-driving hydraulic pump and a power takeoff hydraulic pump, the pumps having drive gears respectively meshing with the gear at the opposite sides thereof, so as to force working oil into a wheel-driving clutch unit and a power takeoff clutch unit through individual oil passages and to thereby cause the oil to push the pistons of the unit, whereby the clutch units can be disengaged or engaged independently of each other for interruption or transmission of the power of engine.

Another object of this invention is to provide a hydraulic double clutch of the wet type in which the oil passages are provided in the shape of bores and grooves formed in the clutch casing and a bearing case by boring or like machining means without employing a piping system, so as to render the construction of the oil passages simple and to thereby minimize pressure losses.

Another object of this invention is to provide a hydraulic double clutch of the wet type in which each of the oil passages is provided, at an intermediate portion thereof, with means including a poppet valve as a control valve, the means of the oil passages being operable independently of each other and each being automatically openable when the pressure on the corresponding clutch piston builds up to excess, so that the poppet valve is serviceable as a pressure regulating valve.

Another object of this invention is to provide a hydraulic double clutch of the wet type in which the pressure set by the poppet valve is determined by a double spring comprising a plurality of spring elements and the valve is provided with means by which it is step-wise continuously operable so that the clutch can be brought into an intermediate state between engagement and disengagement, namely semi-engaged state.

Another object of this invention is to provide a hydraulic double clutch of the wet type in which a spring other than a pressure relief spring is provided between a clutch cam lever and the valve element for the transmission of movement of the lever to assure semi-engagement of the clutch.

Another object of this invention is to provide a hydraulic double clutch of the wet type in which the clutch piston is formed with a bore for passing part of working oil therethrough and the driven disk assembly of the clutch is formed with bores diametrically extending therethrough, whereby while the clutch is in semi-engaged state, part of the working oil is positively applied to the clutch disks to thereby effectively prevent the clutch disks from carbonization and adhesion due to frictional heat.

Still another object of this invention is to provide a hydraulic double clutch of the wet type in which the bearing case for the clutch casing is serviceable also as the mounting seats for the hydraulic pumps and which is thereby made extremely compact although it is a double clutch.

In particular, the present invention provides a hydraulic double clutch comprising a tractor-driving clutch unit and a power takeoff clutch unit accommodated in a clutch housing serving also as an oil tank. Hydraulic pumps disposed in the housing have gears respectively meshing with a gear on the drive disk assembly of the double clutch to force the working oil into the clutch units through individual oil passages and to push the pistons of the units. Each of the oil passages is provided with a poppet valve at an intermediate portion thereof. The poppet valves are opened or closed to disengage or engage the clutch units independently of each other for interruption or transmission of the torque of engine. Each of the valves is automatically opened when the pressure on the piston builds up to excess and is therefore serviceable also as a pressure control valve. The valve is operable to bring the clutch unit into substantially semi-engaged state.

DESCRIPTION OF THE PREFERRED EMBODIMENTS

FIGS. 1 to 4 show the flywheel 1 of an engine and a hydraulic double clutch of the wet type 2 for effecting or interrupting transmission of the torque of the engine to a speed change shaft 3 for driving wheels and to a power takeoff drive shaft 4 individually independently. The clutch 2 comprises a wheel-driving clutch unit 5 and power takeoff clutch unit 6 and is provided between an output shaft 7 fixed to the flywheel 1 and an input shaft 8 for speed change means in front-to-rear relationship.

The output shaft 7 serving as the drive shaft of the clutch is coaxial with the input shaft 8 serving as the driven shaft of the clutch. The driven shaft is in the form of a double shaft including a solid shaft 9 and a cylindrical shaft 10 fitted around the solid shaft 9. Substantially, the solid shaft 9 is the driven shaft of the wheel-driving clutch unit 5 and the cylindrical shaft 10 is the driven shaft of the power takeoff clutch unit 6. (See FIG. 2.)

Figure 3:
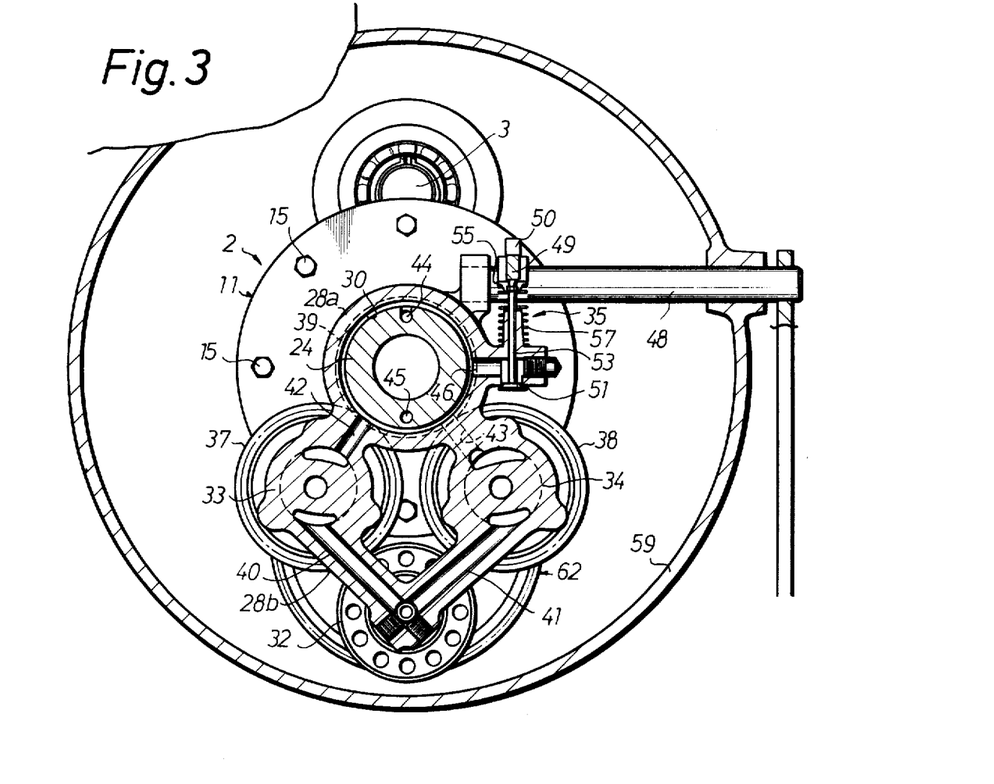
FIG. 3 is a view in section taken along the line 3—3 in FIG. 1 as seen in the direction of the arrows.

A clutch casing 11 comprises an intermediate case unit 12 including a central partition and front and rear case units 13 and 14 holding the case unit 12 therebetween. The case units 12, 13 and 14 are fastened together by members 15 such as bolts as seen in FIG. 3. The fastening members 15 are arranged circumferentially at specified spacing. Between the fastening members 15, the outer peripheral wall of the intermediate case unit 12 is formed with windows or apertures 16 to promote dissipation of heat. The intermediate case unit 12 is rotatably supported, at its center portion, by the solid shaft 9 and is divided by the partition 12a into front and rear cylinder chambers. Clutch pistons 17 and 18 are disposed in the cylinder chambers respectively in axially slidable manner. The cylinder chambers accommodate driven disk assemblies 19 and 20. The driven disk assembly 19 for the wheel-driving clutch unit is mounted on the front end of the solid shaft 9 as by spline means, whilst the driven disk assembly 20 for the power takeoff clutch unit is mounted on the front end of the cylindrical shaft 10 as by spline means. Each of the driven disk assemblies 19 and 20 comprises a bowl-like portion and driven disks fitted around the bowl-like portion, for example, by spline means and movable only in axial directions.

Interposed between the driven disks of each clutch unit are drive disks which are supported at their peripheral portions by pin members 21 (those in clutch unit 5 not shown) which are parallel to the input shaft. Accordingly, the drive disks are slidable along the pin members 21 (see FIG. 2). As already known, the drive disks and driven disks constitute clutch disks 22 and 23 for the clutch units 5 and 6 respectively. In the embodiment shown in FIG. 2, the clutch units are of the multiple disk type.

Figure 1:
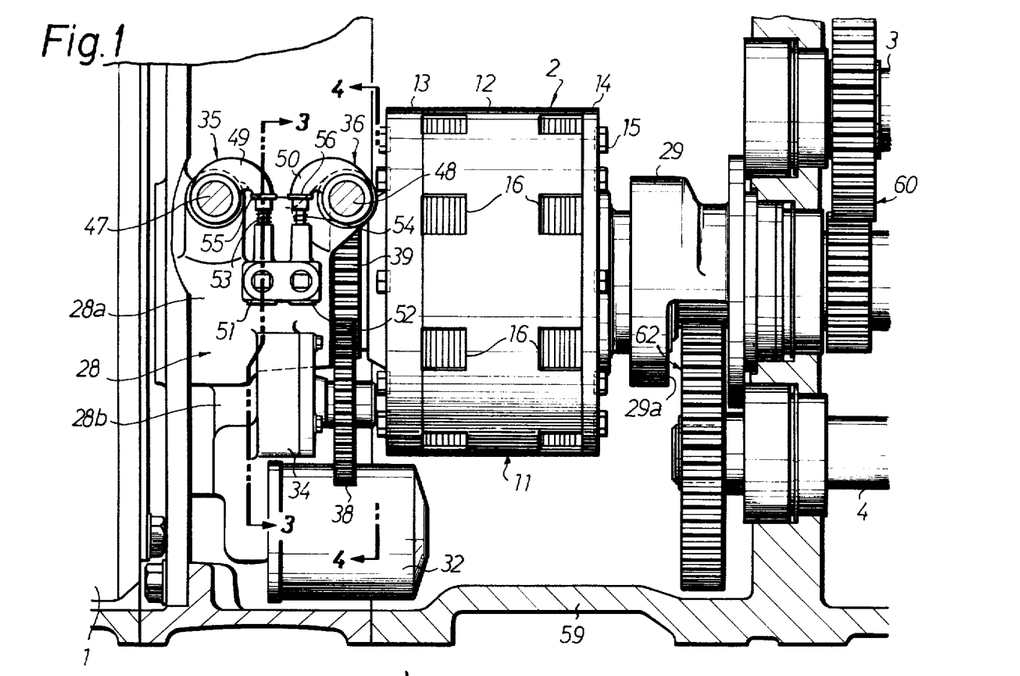
FIG. 1 is a side elevation showing the overall appearance of a hydraulic double clutch of the wet type according to this invention.
Figure 2:
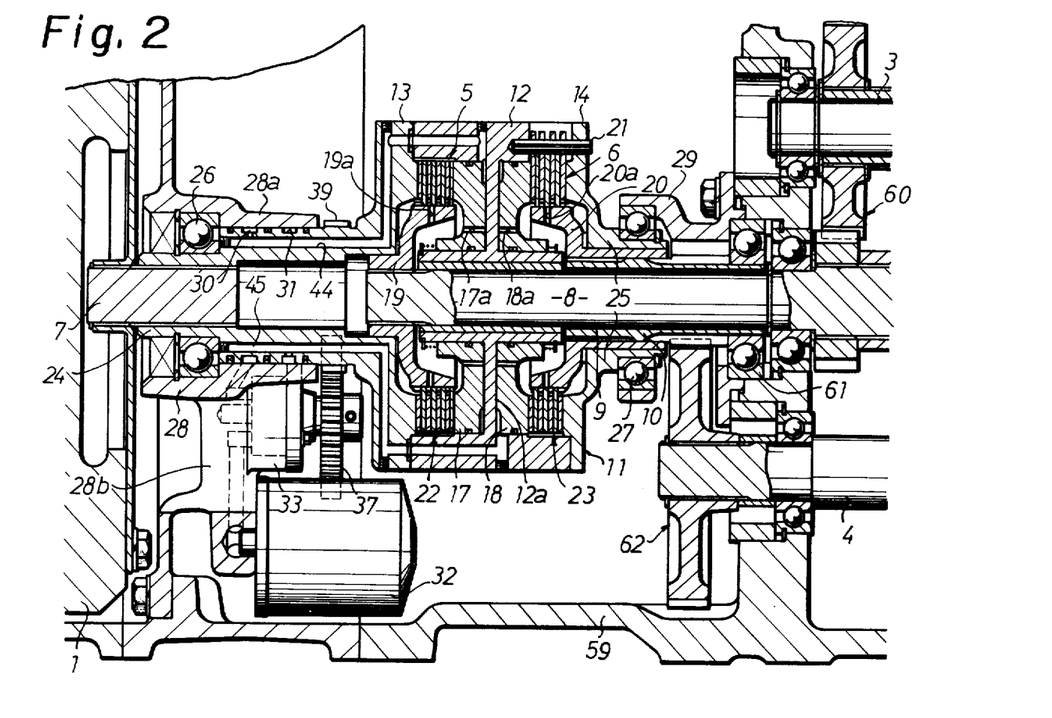
FIG. 2 is a view in vertical section of the clutch.

The front and rear case units 13 and 14 have, each at its side, cylindrical boss portions 24 and 25 respectively. As illustrated in FIG. 2, the cylindrical boss portion 24 of the former 13 is fixedly mounted on the output shaft 7, whilst the boss portion 25 of the latter 14 is rotatably fitted around the cylindrical portion of the driven disk assembly 20 of the power takeoff clutch unit 6.

The front and rear cylindrical boss portions 24 and 25 of the clutch casing 11, which is rotatably supported by the solid shaft 9, are rotatably supported by bearings 26 and 27 in bearing cases 28 and 29 as shown in FIG. 2, with the boss portion 24 connected to the output shaft 7, so that the clutch casing 11 is positively driven by the torque of the engine and serves as the drive element of the clutch.

The bearing case 28 substantially includes a cylindrical boss portion 28a and a mounting seat portion 28b. The inner surface of the boss portion 28a is in oil-tight sliding contact with the outer surface of the boss portion 24. The boss portion 24 is formed in its outer peripheral surface with front and rear circumferential annular grooves 30 and 31 serving as oil passages.

Figure 4:
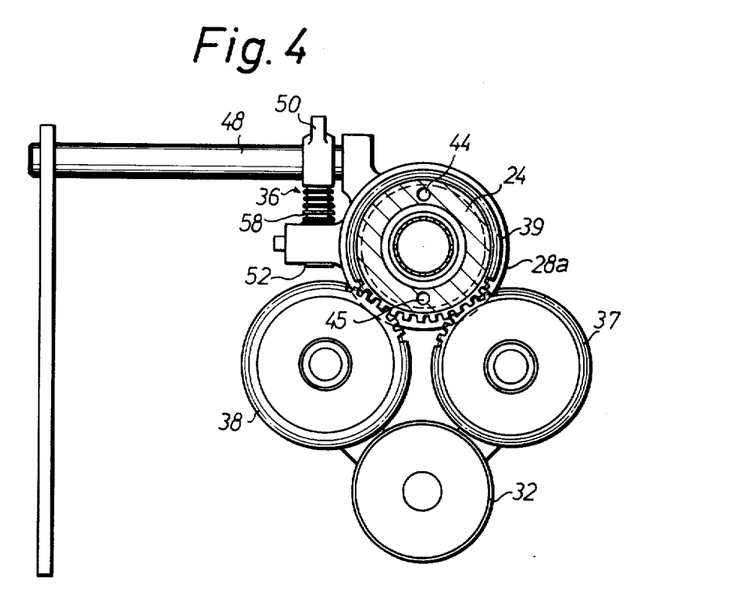
FIG. 4 is a view in section taken along the line 4—4 in FIG. 1.

The bearing case 28 serves also as a mounting seat for an oil filter 32, hydraulic pumps 33 and 34 and control valves 35 and 36. As shown in FIGS. 3 and 4, the hydraulic pump 33 for the wheel-driving clutch unit and the hydraulic pump 34 for the power takeoff clutch unit are removably attached to a mounting seat portion 28b at the opposite sides of the boss portion 24 therebelow. The hydraulic pumps have gears 37 and 38 meshing with a single gear 39 formed in the boss portion 24. The engine, when operated, drives the pumps 33 and 34, whereby the working oil passed through an oil filter 32 is withdrawn by way of individual inlet oil passages 40 and 41 and forced out through outlet oil passages 42 and 43 provided for the pumps respectively. The oil filter 32 is disposed below the pumps 33 and 34 and removably mounted on the portion 28b. The inlet oil passages 40 and 41 and outlet oil passages 42 and 43 are independently formed in the mounting seat portion 28b of the bearing case 28 by boring. The outlet oil passage 42 communicates with the annular oil passage 30, and the outlet oil passage 43 with the annular oil passage 31.

The annular oil passage 30 communicates with an oil passage 44 formed in the clutch casing 11 by boring, whilst the other annular oil passage 31 communicates with an oil passage 45 formed in the clutch casing 11 by boring. As illustrated in FIG. 2, the former oil passage 44 is designed to feed the working oil into the wheel-driving clutch unit to cause the oil to push the piston 17. The piston 18 is adapted to be pressed with the oil introduced into the power takeoff clutch unit by way of the latter oil passage 45. Thus the pistons 17 and 18 are pressed with the oil independently of each other.

Each of the annular oil passages 30 and 31 is formed, at an intermediate portion thereof, with an oil drain 46 in communication therewith. FIG. 3 shows the drain 46 for the passage 30 only. The oil drain 46 is provided with a control valve 35 for controlling engagement and disengagement of the clutch unit 5 and for regulating the oil pressure to be applied to the piston 17. The other annular oil passage 31 has the same means as above, namely a control valve 36. As will be apparent from FIG. 1, the valves 35 and 36 are independent of each other.

The control valves 35 and 36 comprise clutch cam lever shafts 47 and 48 operable by the force applied to clutch pedals or levers and delivered to the shafts via link means or the like, clutch cam levers 49 and 50 fixed to the shafts 47 and 48, poppet valve elements 53 and 54 operable by the levers 49 and 50 to open or close drain ports 51 and 52, and valve springs 57 and 58 bearing against spring holders 55 and 56 always biasing the valve elements 53 and 54 to close the ports 51 and 52.

As seen in FIGS. 1 to 4, the clutch casing 11, hydraulic pumps 33 and 34 of the toroidal type, oil filter 32 and control valves 35 and 36 are accommodated in a clutch housing serving also as the tank for the working oil. The clutch cam lever shafts 47 and 48 (only one shown in FIGS. 3 and 4) are supported by the clutch housing 59.

As shown in FIG. 2, the solid shaft 9 is adapted to transmit power to the wheel-driving speed change shaft 3 by gear means 60. By gear means 62 including a gear formed in the cylindrical shaft 10 and a gear keyed to the power takeoff shaft 4 meshing with the gear of the shaft 10, the cylindrical shaft 10 supported by a bearing 61 is adapted to transmit power to the power takeoff shaft 4. The bearing case 29 has a cutout 29a for the gear means 62.

For the dissipation of heat from the interior of the clutch casing 11, the outer peripheral wall of the clutch casing 11 immersed in oil has a suitable number of windows or apertures 16. To assure more effective heat dissipation, the pistons 17 and 18 are formed with bores 17a and 18a positioned close to the center thereof and extending transversely therethrough, and the bowl-like portions of the driven disk assemblies 19 and 20 have bores 19a and 20a diametrically extending therethrough.

With the foregoing embodiment shown in FIGS. 1 to 4, the output shaft 7, when driven by the engine, rotates the clutch casing 11 therewith, since the casing 11 has its cylindrical boss portion 24 connected to the shaft 7 and is rotatable about a horizontal axis within the clutch housing 59. By virtue of the construction in which the cylindrical boss portion 24 has the gear 39 meshing with the pump gears 37 and 38 at the opposite sides of the gear 39, the hydraulic pumps 33 and 34 provided independently of each other are driven by the casing. By the operation of the hydraulic pumps 33 and 34, the working oil in the clutch housing 59 is passed through the filter 32, introduced into the individual inlet oil passages 40 and 41 and is thereafter forced into the individual annular oil passages 30 and 31 by way of the outlet oil passages 42 and 43. Through the oil passages 44 and 45 communicating with the annular oil passages 30 and 31, the working oil is forced against the piston 17 in the wheel-driving clutch unit and the piston 18 in the power takeoff clutch unit to fit each group of clutch disks 22 and 23 together, whereby the power is transmitted to the input shaft 8 of double shaft construction composed of the solid shaft 9 and cylindrical shaft 10. Because the individually independent hydraulic pumps 33 and 34 are directly coupled to the engine, the oil in the clutch housing 59 is forced into the clutch units to push the pistons 17 and 18 all the time while the engine is in operation. However, when the pressure becomes excessive, the poppet valve elements 53 and 54 automatically open, thereby regulating the pressure to a constant level all the time. More specifically, since the drains 46 (only one shown) each communicating with an intermediate portion of the annular oil passages 30 and 31 are provided with the poppet valve elements 53 and 54 which are always so biased by the springs 57 and 58 as to close the drain ports 51 and 52, an excess pressure moves the valve elements 53 and 54 in the direction to open the valves against the springs 57 and 58, whereby the excess pressure is released from the drain ports 51 and 52. Thus the use of valve springs 57 and 58 having suitable spring characteristics enables the poppet valve elements 53 and 54 to control the pressure on the clutch pistons 17 and 18 to a constant level all the time.

To disengage the clutch, unillustrated clutch pedals or clutch levers are moved to turn, through link means (not shown), the clutch cam lever shafts 47 and 48, which in turn depress the clutch cam levers 49 and 50 against the action of the springs 57 and 58, the levers 49 and 50 being fixed to the shafts 47 and 48, whereby the poppet valves 53 and 54 are completely opened. As a result, the working oil in the oil passages is run off from the corresponding drain ports 51 and 52 into the clutch housing 59. The clutch pistons 17 and 18 are therefore freed from pressure and moved backward by return springs provided therefor. In this way, power transmission to the driven elements of the wheel-driving system and power takeoff system is interrupted individually independently.

According to the basic embodiment of this invention illustrated in FIGS. 1 to 4, the clutch housing 59 serving also as the oil tank incorporates therein the clutch casing 11 including the wheel-driving clutch unit and the power takeoff clutch unit as arranged side by side in front-to-rear relation. Accordingly, the clutch casing 11 is extremely compact although including a double clutch assembly. The embodiment further includes the construction in which the cylindrical boss portion 24 of the clutch casing 11, acting as the drive element of the clutch, has the gear 39 meshing with the gears 37 and 38 of the hydraulic pumps 33 and 34 for wheel driving and for power takeoff, with the gears 37 and 38 disposed at the opposite sides of the gear 39. This arrangement effectively utilizes the dead space of the clutch housing 59 in providing independent hydraulic pumps 33 and 34 for the wheel-driving and power takeoff clutch units respectively, rendering the overall clutch assembly compact and eliminating the necessity of elongating the clutch housing.

The embodiment is further characterized in that the bearing case 28 for the clutch casing 11 rotatable with the engine is utilized as the mounting for the hydraulic pumps 33 and 34 and control valves 35 and 36 and includes the oil passages for the working oil. This also serves to make the overall construction compact and to reduce the number of the constituent parts. The construction in which the bearing case 28 and the clutch casing 11 are utilized in providing the oil passages no longer necessitates a complex piping system heretofore employed and makes it possible to reduce the number of the bent passage portions, thereby precluding oil pressure losses. The control valves 35 and 36 provided intermediately of the individually independent oil passages and operable independently of each other assure that the wheel-driving clutch unit and the power takeoff clutch unit are engageable and disengageable individually. The poppet valve elements 53 and 54 employed for the control valves 35 and 36 and acting also as pressure regulating valves maintain the oil pressure on the pistons 17 and 18 always at a constant and proper level and are useful to simplify the construction of the clutch.

These are various advantages of the embodiment shown in FIGS. 1 to 4. According to this invention, the control valves 35 and 36 are further improved to render the clutch semi-engageable relatively easily, although the clutch is of the hydraulic wet type. With hydraulic clutches, the excellent responsiveness thereof ensures smooth engagement and disengagement, whereas it is very difficult to bring them into semi-engaged state. In consequence, the clutch grabs, possibly causing a jolt or, in the case of agricultural tractors, abruptly subjecting a rotary tiller or like working implement to a load which will cause damage to the implement during operation. If the field worked on is hard soil, an excess load will then act on the tines of the tiller unit, causing the tractor body to jolt or jump forward.

It is an object of this invention to provide further improvements in the above-mentioned control valve, namely in the means for controlling the pressure on the clutch piston so as to remedy the drawback of hydraulic clutches of the wet type while ensuring the advantages thereof.

This will become apparent from the following detailed description given with reference to the embodiments shown in FIGS. 5 to 10. Since the means for semi-engaging the wheel-driving clutch unit has the same construction as like means for the power takeoff clutch unit in the case of hydraulic double clutch of the wet type, the following description will be given in connection with only one of the clutch units.

Figure 5:
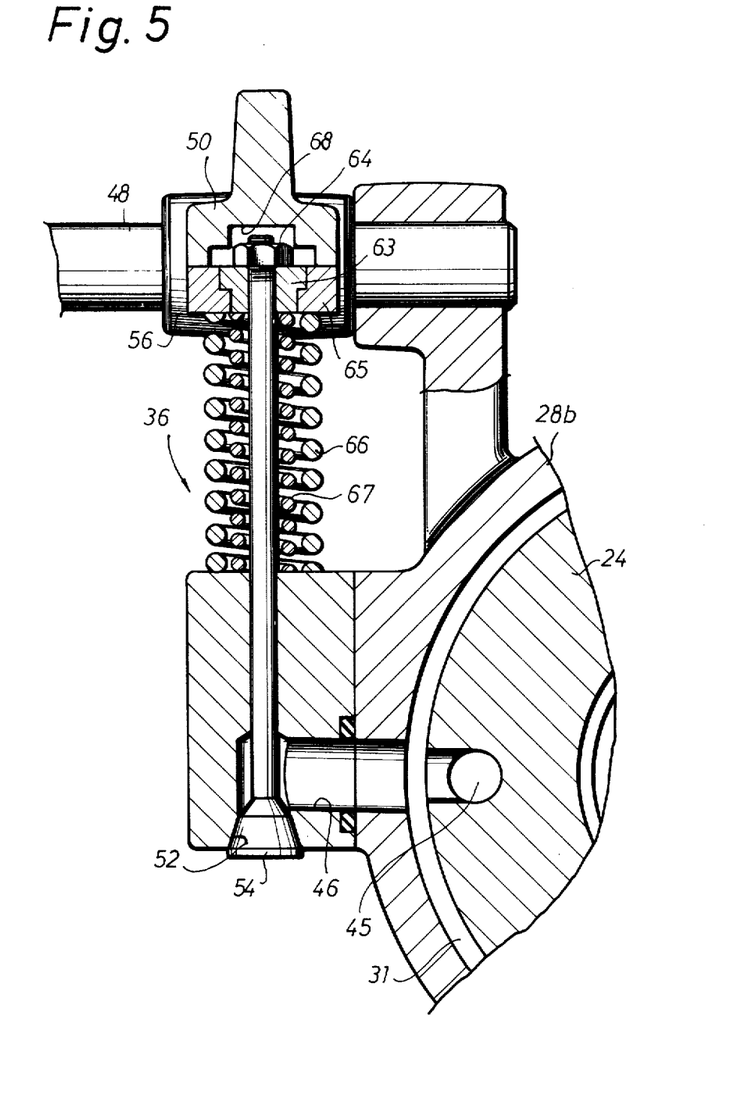
FIG. 5 is an enlarged view in section showing a hydraulic control valve when the clutch is engaged.
Figure 6:
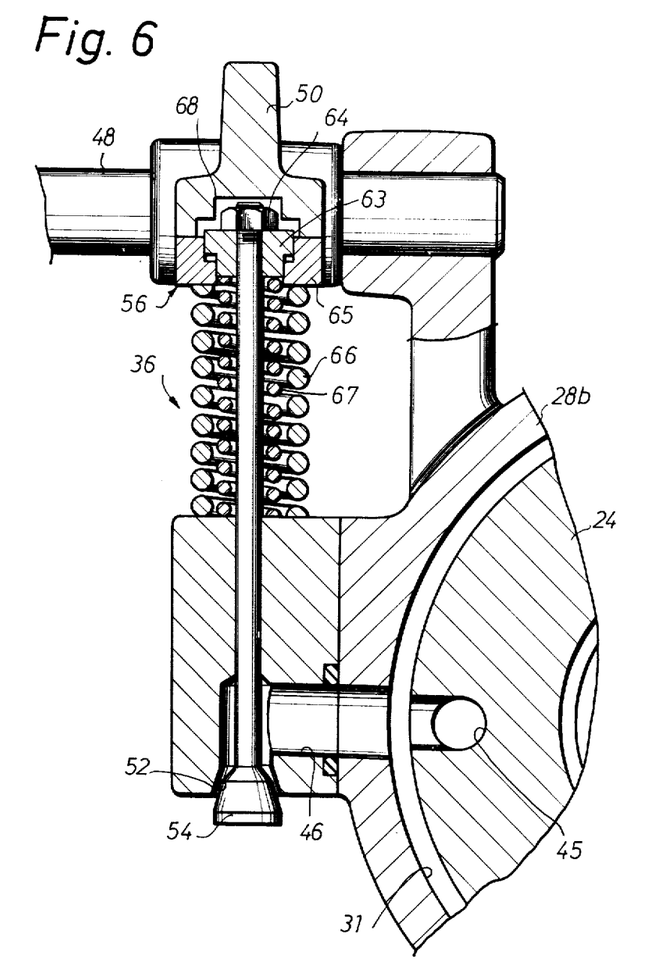
FIG. 6 is a view in section showing the same when the clutch is in semi-engaged state.
Figure 7:
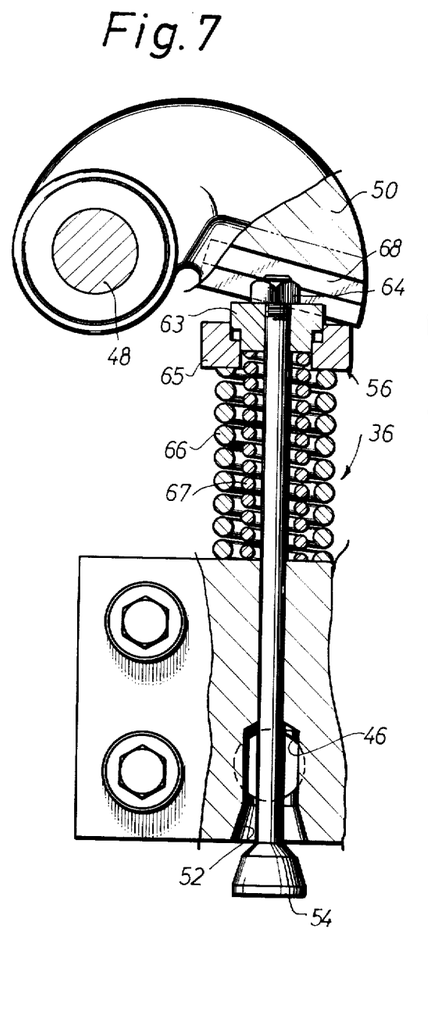
FIG. 7 is a view in section showing the same and taken along the lines 7—7 in FIG. 5 when the clutch is disengaged.

With reference to FIGS. 5 to 7, the spring holder 56 mounted on the upper end of valve stem of the poppet valve element 54 is in the form of a double construction and is composed of an inner spring holder 63 and an outer spring holder 65. The inner spring holder 63 is mounted on the valve stem by a threaded connecting member 64 in axially adjustable manner. The outer spring holder 65 is biased by a valve spring into engagement with the inner spring holder 63 and is thus engageable only in the direction of action of the spring. The spring 66 bearing against the holder 65 always biases the valve element 54 in the valve closing direction. Another spring 67 weaker than the spring 66 bears against the inner holder 63. The combination of the springs 66 and 67 sets the oil pressure on the piston 18 at a constant level. The clutch cam lever 50 is formed, in a portion thereof opposing the threaded connecting member 64, with a cavity 68 for receiving the member 64. The control valve 36 shown in FIGS. 5 to 7 assures semi-engagement of the clutch in the following manner.

When the clutch cam lever 50 is pivotally moved downward in the drawings about the lever shaft 48 by moving the clutch lever to disengage the clutch, the lever 50 which is in contact with the spring holder 65 compresses the outer valve spring 66 and disengages the spring holder 65 from the holder 63, thereby reducing the pressure setting. Consequently, the valve element 54 moves down while being held in balance by the inner spring 67, thereby partly opening the drain port 52 as shown in FIG. 6. Thus the valve element 54 is held in balance, permitting part of the working oil to be released from the drain port 52. The oil pressure acting on the piston 18 is maintained at a level below the full pressure, and the clutch is in semi-engaged state. When the clutch operating lever is further moved to a greater extent than in the state of FIG. 6, the cavity portion 68 of the clutch cam lever 50 comes into contact with the threaded connecting member 64, thereby opening the valve element 54 against both the springs 66 and 67. When the valve element 54 is completely opened, the oil is run off from the drain port 52 to nullify the oil pressure on the piston 18, which is accordingly returned to disengage the clutch unit 6. When the clutch operating lever is reversely moved to bring the control valve in the state of FIG. 7 to the clutch engaging state, the valve element 54 is brought upward while reducing the opening of the drain port 52 and while being held in balance by the valve spring 67 until the spring holders 63 and 65 comes into engagement with each other. In the meantime, the clutch unit is brought to the semi-engaged state shown in FIG. 6 and then back to the position illustrated in FIG. 5, i.e. to engaged position. In this way, the clutch unit can be brought to semi-engaged state between engagement and disengagement by the construction in which the inner and outer springs 67 and 66 and spring holders 63 and 65 are included to operate the poppet valve element in differential manner.

Figure 8:
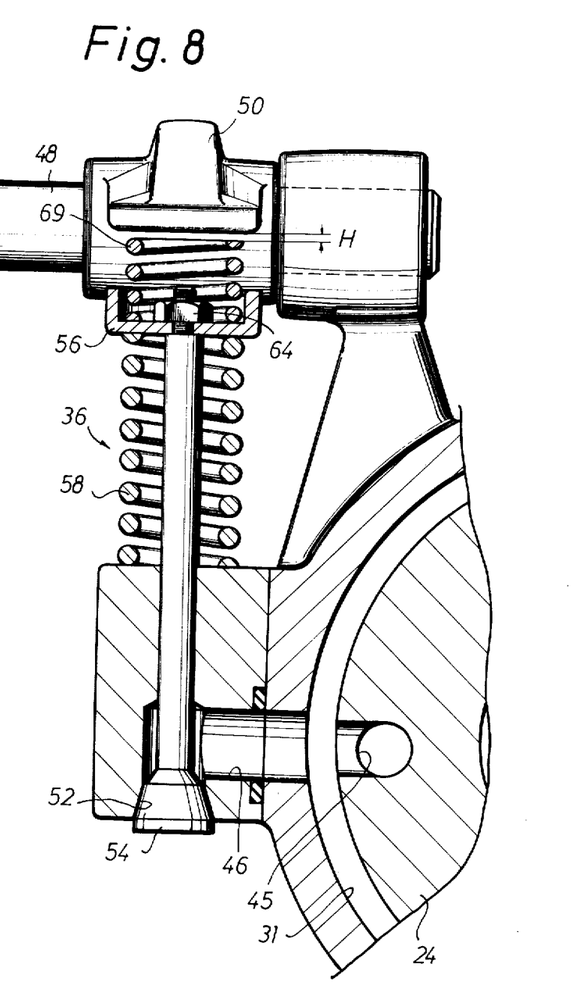
FIG. 8 is an enlarged view in section showing another embodiment of hydraulic control valve when the clutch is engaged.
Figure 9:
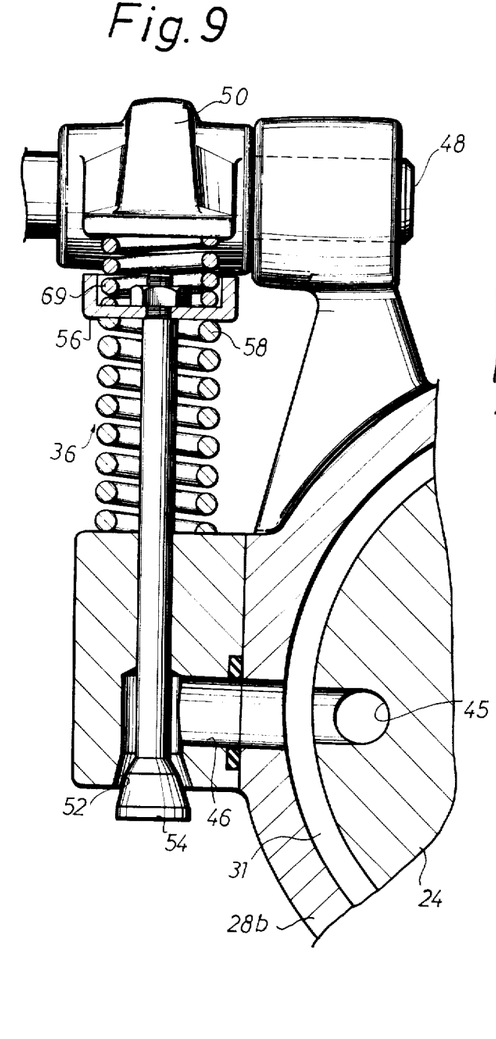
FIG. 9 is a view in section showing the other embodiment when the clutch is in semi-engaged state.
Figure 10:
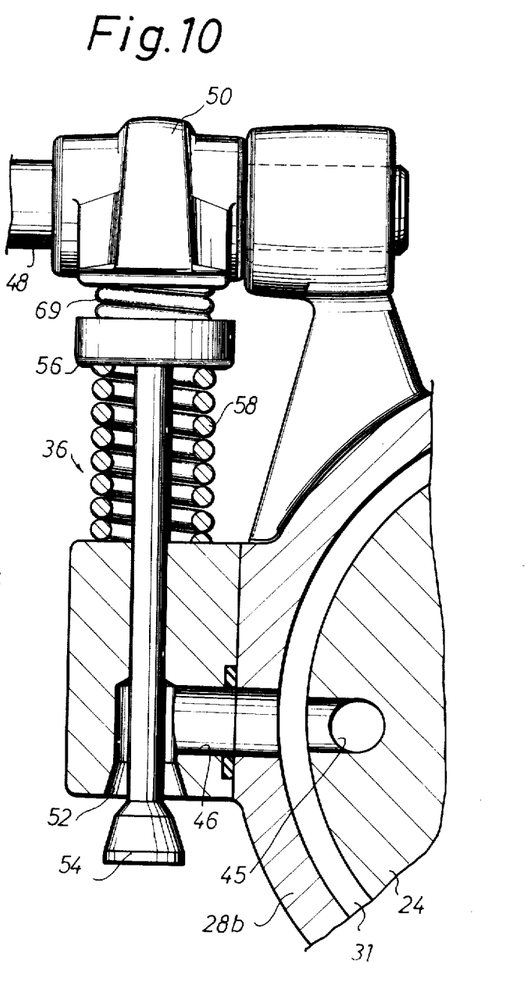
FIG. 10 is a view showing the other embodiment when the clutch is disengaged, the view being in section.

The clutch unit can be semi-engageable by another embodiment, shown in FIGS. 8 to 10, in which a spring 69 other than the valve spring 58 and weaker than the spring 58 is interposed between an integral spring holder 56 and clutch cam lever 50, with a very small clearance H provided between the lever 50 and the spring 69. The spring 69 is substantially retained by the spring holder 56. When the clutch operating lever is moved, the clutch cam lever 50 in the clutch engaging state in FIG. 8 is pivotally moved about the lever shaft 48, thus acting to move the valve element 54 in the valve opening direction. However, because of the provision of the spring 69, the force of the pivotally moving lever 50 is not delivered directly to the valve element 54 and the displacement of the lever 50 is not converted directly to the stroke of the valve element 54, with the result that before the valve is completely opened, the drain port 52 is maintained in a semiopen state for a prolonged period of time. This permits the oil to partially run off from the port and assures semi-engagement of the clutch unit (FIG. 9). Subsequently, further movement of the clutch operating lever causes the cam lever 50 to completely compress the spring 69 and to depress the valve element 54, against the valve spring 58, to the completely open position shown in FIG. 10, whereupon the clutch unit is disengaged. When the clutch operating lever is progressively relieved of the operating force, the valve element in FIG. 10 returns to the position of FIG. 9 and then to the position of FIG. 8 while reducing the opening of the drain port 52.

In accordance with either of the foregoing embodiments, it is assured that the displacement of the clutch cam lever 49 (50) will not be converted directly to the stroke of the valve element 53 (54). The valve element therefore does not operate abruptly but opens or closes gently to bring the clutch into semi-engaged state. When the clutch is semi-engaged, slippage will take place between the drive disks and the driven disks relative to each other, possibly causing the adhesion of clutch disks 22 and 23 and carbonization thereof due to frictional heat. However, the bores 17a and 18a extending through the pistons 17 and 18 and the diametrical bores 19a and 20a formed in the driven disk assemblies as seen in FIG. 2 permit part of the oil pushing the pistons 17 and 18 to pass through the bores 17a and 18a into the interior of the clutch units. The oil flowing in is forced radially outward by centrifugal force, whereby the clutch disks are sufficiently cooled.

Apparently the objects of this invention can be fulfilled by the foregoing embodiments, which however are given for illustrative purposes only and are not limitative in any way. Various other improvements and alterations can be made, and the clutch of this invention may further include other means. For example, both or either of the control valves for the wheel-driving clutch unit and for the power takeoff clutch unit may incorporate the means as illustrated in FIGS. 5 to 7 for ensuring semi-engagement of the clutch. Similarly, both or either of the control valves may include the means as shown in FIGS. 8 to 10 for semi-engaging the clutch. Furthermore one of the control valves may include the means of FIGS. 5 to 7, with the other including one shown in FIGS. 8 to 10.

What is claimed is:

1. A hydraulic double clutch of the wet type comprising a drive shaft, a driven shaft coaxial with the drive shaft and having a double shaft construction, a clutch casing fixedly mounted on the drive shaft and rotatably mounted on the driven shaft, the clutch casing accommodating a wheel-driving clutch unit and a power take-off clutch unit independent of the clutch unit, hydraulic pumps for forcing working oil into the clutch units to engage the clutch units individually independently, oil passages for forcing the working oil form the hydraulic pumps into the corresponding clutch units individually independently, control valve means independent of each other and provided for the oil passages each at an intermediate portion of the passage, the control valve means being openable and closable to control the pressure of the working oil, and a clutch housing accommodating the aforesaid members and means and serviceable also as a tank for the working oil, the clutch casing being rotatably supported by bearing cases at its front and rear portions respectively with bearings interposed between the casing and the bearing cases, the clutch casing having a gear in meshing engagement with the hydraulic pumps to drive the pumps, the hydraulic pumps being arranged at the opposite sides of the gear respectively, the oil passages being formed independently of each other in one of the bearing cases and in the clutch casing, the control valve means being automatically openable when the oil pressure on the clutch units builds up to excess to control the pressure.

2. A hydraulic double clutch of the wet type as defined in claim 1 wherein the bearing case formed with the oil passages includes a mounting seat for the hydraulic pumps, and the hydraulic pumps are removably mounted on the seat.

3. A hydraulic double clutch of the wet type as defined in claim 1 wherein each of the control valve means for the clutch units includes a relief valve whose pressure setting is determined by a double valve spring composed of an outer spring element and an inner spring element and biasing a valve element, whereby stepwisely varying pressures are available.

4. A hydraulic double clutch of the wet type as defined in claim 1 wherein each of the control valve means for the clutch units includes an additional spring other than a pressure relief spring and provided between a clutch cam lever and a valve element to transmit the movement of the clutch cam lever to the valve element through the additional spring.

5. A hydraulic double clutch of the wet type comprising a drive shaft, a driven shaft coaxial with the drive shaft and having a double shaft construction, a clutch casing fixedly mounted on the drive shaft and rotatabl, mounted on the driven shaft, the clutch casing accommodating a wheel-driving clutch unit and a power take-off clutch unit independent of the clutch unit, hydraulic pumps for forcing working oil into the clutch units to engage the clutch units individually independently, oil passages for forcing the working oil from the hydraulic pumps into the corresponding clutch units individually independently, control valve means independent of each other and provided for the oil passages each at an intermediate portion of the passage, the control valve means being openable and closable to control the pressure of the working oil, and a clutch housing accommodating the aforesaid members and means and serviceable also as a tank for the working oil, the clutch casing being rotatably supported by bearing cases at its front and rear portions respectively with bearings interposed between the casing and the bearing cases, the clutch casing having a gear in meshing engagement with the hydraulic pumps to drive the pumps, the hydraulic pumps being arranged at the opposite sides of the gear respectively, the oil passages being formed independently of each other in one of the bearing cases and in the clutch casing, the control valve means being automatically openable when the oil pressure on the clutch units builds up to excess to control the pressure, the clutch casing being formed in its outer peripheral wall with windows or apertures for dissipating heat, each of the clutch units including a piston and a driven disk assembly which are formed with bores extending therethrough for cooling clutch disks.

* * * * *